US012773708B2

(12) United States Patent
Fujita

(10) Patent No.: US 12,773,708 B2
(45) Date of Patent: Oct. 27, 2026

(54) SUBSTRATE PROCESSING APPARATUS AND SUBSTRATE PROCESSING METHOD

(71) Applicant: Tokyo Electron Limited, Tokyo (JP)

(72) Inventor: Akira Fujita, Kumamoto (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 655 days.

(21) Appl. No.: 18/016,943

(22) PCT Filed: Jul. 15, 2021

(86) PCT No.: PCT/JP2021/026560

§ 371 (c)(1),
(2) Date: Jan. 19, 2023

(87) PCT Pub. No.: WO2022/024776

PCT Pub. Date: Feb. 3, 2022

(65) Prior Publication Data

US 2024/0033766 A1 Feb. 1, 2024

(30) Foreign Application Priority Data

Jul. 28, 2020 (JP) ................................ 2020-127395

(51) Int. Cl.

| | |
|---|---|
| ***B05B 13/02*** | (2006.01) |
| ***B05B 12/16*** | (2018.01) |
| ***B05B 15/68*** | (2018.01) |

(52) U.S. Cl.

CPC .......... *B05B 13/0278* (2013.01); *B05B 12/16* (2018.02); *B05B 13/0228* (2013.01); *B05B 15/68* (2018.02)

(58) Field of Classification Search

None

See application file for complete search history.

(56) References Cited

U.S. PATENT DOCUMENTS

| | | | | |
|---|---|---|---|---|
| 9,612,434 | B2 * | 4/2017 | Yasuda | H10N 30/8554 |
| 10,835,932 | B2 * | 11/2020 | Nishida | H01L 21/67046 |
| 11,062,899 | B2 * | 7/2021 | Hasimoto | B08B 3/041 |
| 11,164,760 | B2 * | 11/2021 | Fujita | H01L 21/68792 |
| 12,138,666 | B2 * | 11/2024 | Endo | B08B 3/04 |

(Continued)

FOREIGN PATENT DOCUMENTS

| | | |
|---|---|---|
| JP | 2014-179655 A | 9/2014 |
| JP | 2018-46105 A | 3/2018 |

*Primary Examiner* — Sylvia Macarthur

(74) *Attorney, Agent, or Firm* — Nath, Goldberg & Meyer; Jerald L. Meyer; Tanya E. Harkins

(57) ABSTRACT

A substrate processing apparatus includes a substrate holder, a rotational driver configured to rotate the substrate holder, and an ejection part configured to eject a processing liquid toward a liquid landing point of the substrate. The ejection part includes a plurality of nozzles that is different from each other in at least one of a first angle θ or a second angle φ. A circle is defined. An angle formed by a straight line, which interconnects a foot of a perpendicular line from an ejection point of the processing liquid to the substrate and the liquid landing point, and a tangential line to the circle at the liquid landing point is defined as a first angle θ, and an angle formed by that straight line and a straight line, which interconnects the ejection point and the liquid landing point, is defined as a second angle φ.

12 Claims, 4 Drawing Sheets

(56) References Cited

U.S. PATENT DOCUMENTS

| | | | | |
|---|---|---|---|---|
| 2003/0021893 | A1* | 1/2003 | Usami | G11B 7/26<br>427/162 |
| 2004/0197433 | A1* | 10/2004 | Terada | B23K 26/0853<br>257/E23.179 |
| 2015/0147888 | A1* | 5/2015 | Nonaka | H01L 21/6708<br>156/345.21 |
| 2016/0086810 | A1* | 3/2016 | Fujiwara | B08B 3/02<br>156/345.21 |
| 2018/0076057 | A1* | 3/2018 | Ueki | B05C 11/1005 |
| 2021/0098249 | A1* | 4/2021 | Fujita | B08B 3/02 |
| 2024/0033766 | A1* | 2/2024 | Fujita | H01L 21/304 |

* cited by examiner

SUBSTRATE PROCESSING APPARATUS AND SUBSTRATE PROCESSING METHOD

This is a National Phase Application filed under 35 U.S.C. 371 as a national stage of PCT/JP2021/026560, filed Jul. 15, 2021, an application claiming the benefit of Japanese Application No. 2020-127395, filed Jul. 28, 2020, the content of each of which is hereby incorporated by reference in its entirety.

TECHNICAL FIELD

The present disclosure relates to a substrate processing apparatus and a substrate processing method.

BACKGROUND

In manufacturing semiconductor devices, a substrate such as a semiconductor wafer (hereinafter, simply referred to as a "wafer") is held horizontally and rotated around a vertical axis to supply a processing liquid such as a chemical liquid to the peripheral edge portion of the substrate, so that a bevel cutting is performed to locally remove a thin film such as an oxide film present in the peripheral edge portion.

Patent Document 1 discloses a substrate processing apparatus capable of suppressing fluctuation in cut width in a bevel cutting on the peripheral edge portion of a substrate. The substrate processing apparatus includes a fluctuation width acquisition part and an ejection control part. The fluctuation width acquisition part acquires information about the fluctuation width in a distortion amount of the peripheral edge portion of the substrate. The ejection control part controls the ejection angle and the ejection position of the processing liquid from a processing liquid ejection part with respect to the peripheral edge portion according to the above-mentioned information acquired by the fluctuation width acquisition part.

PRIOR ART DOCUMENT

Patent Document

Patent Document 1: Japanese Laid-Open Publication No. 2018-46105

The present disclosure provides a substrate processing technique capable of achieving a desired process performance in processing a film of a peripheral edge portion with a liquid.

SUMMARY

According to an embodiment of the present disclosure, a substrate processing apparatus that processes a peripheral edge portion of a front surface of a substrate with a processing liquid is provided. The substrate processing apparatus includes: a substrate holder configured to hold a substrate; a rotational driver configured to rotate the substrate holder around a rotation axis; and an ejection part configured to eject the processing liquid toward a liquid landing point set in the peripheral edge portion of the front surface of the substrate, wherein, when a circle, which is centered on a foot of a perpendicular line drawn from the liquid landing point to the rotation axis, a radius of which is a line segment interconnecting the foot and the liquid landing point, and which is located on a plane orthogonal to the rotation axis, is defined, and a tangential line to the circle at the liquid landing point is defined, when an angle formed by a straight line, which interconnects a foot of a perpendicular line drawn from an ejection point of the processing liquid to the front surface of the substrate and the liquid landing point, and a tangential line to the circle at the liquid landing point is a first angle θ, and when an angle formed by the straight line, which interconnects the foot of the perpendicular line drawn from the ejection point of the processing liquid to the front surface of the substrate and the liquid landing point, and a straight line, which interconnects the ejection point and the liquid landing point, is a second angle gyp, the ejection part includes a plurality of nozzles that is capable of ejecting a same first processing liquid as the processing liquid, and among the plurality of nozzles, one nozzle and another nozzle are configured to be different from each other in at least one of the first angle θ or the second angle φ.

According to the above-described embodiments, it is possible to achieve a desired process performance in processing a film of a peripheral edge portion with a liquid.

DETAILED DESCRIPTION

An embodiment of a substrate processing apparatus will be described with reference to the accompanying drawings.

Hereinafter, a bevel etching apparatus as an embodiment of a substrate processing apparatus will be described below with reference to the accompanying drawings. The bevel etching apparatus is an apparatus that removes, through wet etching, an unnecessary film on the peripheral edge portion of a semiconductor wafer W (hereinafter, simply referred to as a "wafer"), which is a circular substrate on which semiconductor devices are formed. The peripheral edge portion to be etched in bevel etching generally means a region from APEX of the wafer (the outermost periphery of the curved portion of the edge) to about 5 mm inside the APEX (however, the peripheral edge portion is not limited to this range).

Figure 1:
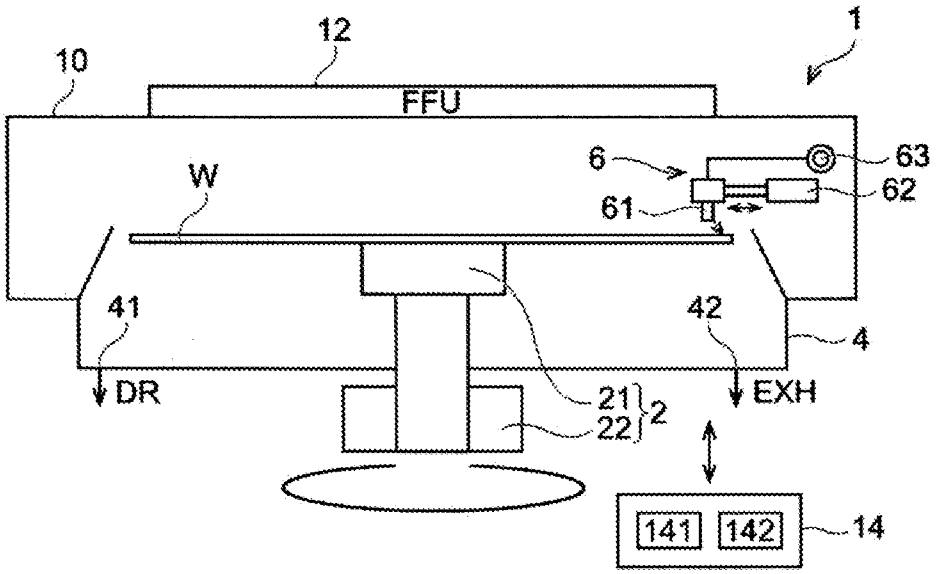
FIG. 1 is a schematic vertical cross-sectional view of a bevel etching apparatus according to an embodiment of a substrate processing apparatus.

As illustrated in FIG. 1, a wet etching apparatus (hereinafter, simply referred to as an "etching apparatus") 1 includes a spin chuck (a substrate holding and rotating part) 2, a processing cup 4, and a processing fluid ejection part 6 (hereinafter, simply referred to as an "ejection part"). The spin chuck 2 holds a substrate to be processed (herein, a wafer W) in a horizontal posture and rotates the wafer W around a vertical axis. The processing cup 4 surrounds the wafer W held by the spin chuck 2 and receives (collects) a processing liquid scattered from the wafer W. The ejection part 6 ejects a processing fluid such as a processing liquid or a processing gas onto the wafer W held by the spin chuck 2.

The spin chuck 2, the processing cup 4, and the ejection part 6 are accommodated in a single housing 10. A clean gas introduction unit 12 (hereinafter, referred to as a "fan filter unit (FFU)") is provided near the ceiling of the housing 10. The bottom of the processing cup 4 is provided with a drain port 41 configured to discharge the collected processing liquid to the exterior of the etching apparatus 1 and an exhaust port 42 configured to exhaust the internal space of the processing cup 4. A clean gas (e.g., clean air) introduced from the FFU 12 is drawn into the processing cup 4 by exhausting the internal space of the processing cup 4 through the exhaust port 42. The clean gas is drawn into the processing cup 4 while passing outward through the vicinity of the peripheral edge portion of the wafer W generally in the radial direction, thereby suppressing redeposition of droplets of the processing liquid scattered from the wafer W onto the wafer W.

The spin chuck 2 includes a chuck part (a substrate holder) 21 configured as a vacuum chuck, and a rotational driver 22 configured to rotate the chuck part 21 around a vertical axis. The bottom surface (the rear surface) of the wafer W is attracted to the top surface of the chuck part 21.

The ejection part 6 includes a nozzle 61 configured to eject the processing fluid, a nozzle moving mechanism 62 configured to move the nozzle 61, and a processing fluid supply mechanism (a processing liquid supply mechanism) 63 configured to supply the processing fluid to the nozzle 61. The processing fluid supply mechanism 63 may include a processing fluid source such as a tank or factory power source, a pipeline configured to supply the processing fluid from the processing fluid source to the nozzle 61, a flow meter provided in the pipeline, an opening/closing valve, a flow control valve, and the like. Examples of processing fluids may include a chemical liquid (etchant), a rinse liquid, an organic solvent for assisting drying such as isopropyl alcohol (IPA), and a low-humidity gas (e.g., dry air, nitrogen gas, or the like). However, in the following description, only a liquid (especially a chemical liquid or a rinse liquid) will be described as a processing fluid ejected from the nozzle 61.

The nozzle moving mechanism 62 is configured to be able to adjust at least the radial position of the liquid landing point of the processing liquid ejected from the nozzle 61 on the front surface of a wafer W. The liquid landing point means an intersection point between the central axis of a liquid column of a processing liquid ejected from the nozzle 61 and the front surface of the wafer W, and is indicated by reference numeral $P_F$ in FIG. 2.

The ejection part 6 includes two or more (e.g., four) nozzles 61 provided at different positions of the circumferential direction of the wafer W. In FIG. 1, the arrow extending obliquely downward from the nozzle 61 indicates a processing liquid ejected from the nozzle 61.

The basic configuration of the ejection part 6 is provided with a plurality of ejection mechanism sets each of which includes one nozzle 61, one nozzle moving mechanism 62 attached to the one nozzle, and one processing liquid supply mechanism 63. The operation of the etching apparatus 1, which will be described later, will be described on the premise that this basic configuration is adopted. However, two or more processing liquid supply mechanisms 63 (e.g., a processing liquid supply mechanism configured to supply a chemical liquid and a processing liquid supply mechanism configured to supply a rinse liquid) may be connected to one nozzle 61 as long as there is no problem in implementing the operation to be described later. Specifically, the ejection angle of the processing liquid from the nozzle 61 required to achieve a short slope width during etching and the ejection angle of the processing liquid from the nozzle 61 required to achieve a good rinse particle performance (details of which will be described later) during rinsing are equal to each other. In this case, a configuration in which the etchant and the rinse liquid are selectively ejected from the same nozzle 61 may be adopted. Similarly, two or more nozzles 61 may be adapted to be moved by one common nozzle moving mechanism 62 as long as there is no problem in implementing the operation to be described later. In this case, two or more nozzles 61 are held by one common nozzle holder. Further, a same processing liquid may be supplied to each of a plurality of nozzles 61 supplying identical processing liquids via a plurality of processing liquid supply mechanisms 63 connected to a common processing liquid source.

As a detailed configuration of the etching apparatus 1, it is possible to use that disclosed in Japanese Laid-Open Publication No. 2014-086638 (JP2014-086638A), which is an application publication of Japanese Patent Application No. 2012-235974, which is a prior application in the name of the applicant of the present case. In this prior application, the three nozzles are held by one common nozzle holder and moved by one common nozzle moving mechanism. The above-described basic configuration may also be adopted from this prior application.

Next, by exemplifying the case where the nozzle 61 ejects a chemical liquid CHM (etchant) as a processing liquid, various parameters for describing the ejection conditions of the chemical liquid CHM from the nozzle 61 onto the front surface of a wafer W will be described with reference to FIG. 2.

Figure 2:
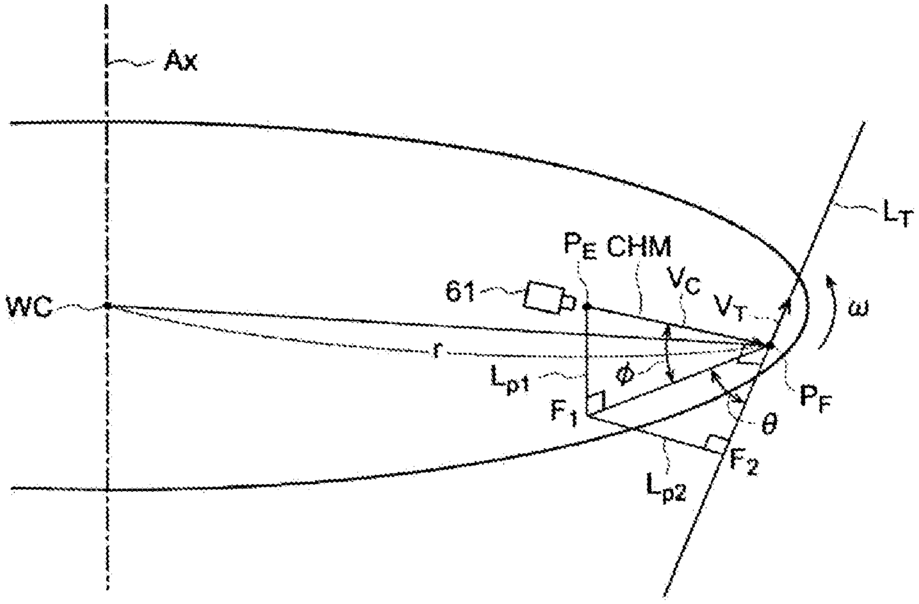
FIG. 2 is a view illustrating various parameters related to ejection of a chemical liquid.

In FIG. 2, the definition of each symbol is as follows.

$A_X$: the rotation axis of a wafer W

WC: the intersection of the front surface of the wafer W and the rotation axis $A_X$ (the rotational center of the wafer W on the front surface of the wafer W)

$P_E$: the ejection point of a chemical liquid CHM (the ejection port of a nozzle 61) $P_F$: the liquid landing point of the chemical liquid CHM on the front surface of the wafer W (the intersection point where the central axis of a liquid column formed by the processing liquid ejected from the nozzle 61 intersects the front surface of the wafer W)

ω: the angular velocity of the wafer W r: the distance from the rotation center WC to the liquid landing point $P_F$ $L_T$: the tangential line at the liquid landing point $P_F$ on the circumference of a circle (which is located on the same plane as the front surface of the wafer W) having a radius r centered on the rotational center WC $V_T$: the tangential velocity of the wafer W at the liquid landing point $P_F$ (=ωr)

$V_C$: the velocity of the chemical liquid CHM from the ejection point P E toward the liquid landing point P E (the magnitude of the velocity vector)

$F_1$: the foot of a perpendicular line $L_{P1}$ drawn from the ejection point P E to the front surface of the wafer W $F_2$: the foot of a perpendicular line $L_{P2}$ drawn from the foot $F_1$ to the tangential line $L_T$ Second angle φ: the angle formed by a line segment P E P E and a line segment $F_1P_F$ (the angle formed by a plane including the front surface of the wafer W and the liquid column formed by the processing liquid ejected from the nozzle 61)

First angle θ: the angle formed by the line segment $F_1P_F$ and a line segment $F_2P_F$ The direction of the tangential component ($V_T$ direction component) of the velocity vector of the chemical liquid CHM is preferably the same as the rotational direction of the wafer W. If the direction of the tangential component of the velocity vector is opposite to the rotational direction of the wafer W, it becomes difficult to control scattering of the chemical liquid CHM (liquid splash). However, the tangential component of the velocity vector of the chemical liquid CHM and the rotational direction of the wafer W may be opposite when there is no problem in controlling the scattering of the chemical liquid CHM.

Each of the above-mentioned parameters is defined in the same way not only when the processing liquid ejected from the nozzle 61 is a chemical liquid, but also when the processing liquid is another processing liquid such as a rinse liquid.

When the nozzle moving mechanism 62 is configured to move the nozzle 61 such that the liquid landing point $P_E$ moves in the radial direction, it is possible to make the first angle θ and the second angle φ substantially constant regardless of the radial position of the liquid landing point $P_F$.

In a specific example to be described later, at least two (e.g., four) nozzles 61 are prepared for ejecting the same processing liquid (herein, HF). Preferably, any two nozzles 61 selected from the plurality of nozzles 61 differ from each other in at least one of the first angle θ or the second angle φ. Herein, "the same processing liquid" means that the processing liquids are completely the same including concentration and temperature.

Based on the "attributes of a wafer W itself or a film formed on the front surface of the wafer W (hereinafter, referred to as 'attributes of a liquid landing portion' for simplicity)" at the liquid landing point $P_F$ of the processing liquid and its vicinity, and the "important process performance," a nozzle 61 capable of ejecting the processing liquid at the first angle θ and the second angle φ at which the important process performance is achievable is selected.

The following are examples of the attributes of a liquid landing portion. For example, when one or more layers of films are formed on the front surface of the wafer W, the attributes mean the property or state of the outermost surface film (e.g., $SiO_x$) itself or the front surface of that film. The "property or state of the front surface of the film" includes, for example, the affinity (wettability) for the processing liquid, surface roughness (morphology), and the like. In addition, the "property of the film itself" includes, for example, an etching rate by an etchant when the processing liquid is the etchant. When no film is formed on the front surface of the wafer (silicon wafer) W, the property of the front surface of the wafer W (e.g., the above-mentioned wettability) or the property of the wafer W itself (e.g., the above-mentioned etching rate or the like) is considered as an attribute of the liquid landing portion.

Examples of the process performances include a small amount of particles (a small number of particles) (which will be mainly called a "particle performance"), bevel etching performed with high cutting accuracy (high cutting accuracy), a small slope width of the outermost periphery of a film left without being etched during bevel etching (short slope width), and so on. As the "important process performance," the one considered most important among the process performances exemplified and listed herein may be selected.

In addition, the particles include those generated during bevel etching (hereinafter, referred to as "chemical liquid particles"), those generated during rinsing (hereinafter, referred to as "rinse particles"), and those generated due to notch splash (hereinafter, referred to as "notch splash particles"), which will be described in detail later.

In the liquid processing of the bevel (processing of the peripheral edge portion) of the wafer W, the process performances are often in a trade-off relationship, and it may sometimes be difficult to determine the first angle θ and the second angle φ at which different process performances are simultaneously achievable. Herein, a first angle θ and a second angle φ that firstly satisfy the "important process performance" are determined.

In the present embodiment, for example, the standard value of the combination of the first angle θ and the second angle φ is set to (θ, φ)=(10°, 20°), and at least one of the first angle or the second angle φ is changed such that deterioration of a process performance other than the important process performance is within an allowable range. (θ, φ)=(10°, 20°) is a condition at which results within the allowable range in all items of process performances which are evaluation targets are obtained.

When the first angle θ and the second angle φ are set to values that significantly deviate from the standard value, there is a high possibility that a process performance other than the important process performance will fall outside the allowable range. Therefore, in the present embodiment, the first angle θ is changed in the range of −10° to +10° from the standard value, and the second angle φ is changed in the range of −5° to 0° from the standard value. However, if there is no problem in the process performances (depending on the attributes of the liquid landing portion), the angle change range may be widened.

Herein, the behavior of the processing liquid immediately after the processing liquid lands on the front surface will be described with reference to FIGS. 3 to 5, in the respective cases where the front surface of a wafer W on which a processing liquid lands (the front surface means both the front surface of the wafer W itself and the front surface of a film formed on the front surface of the wafer W) is a hydrophobic surface or a hydrophilic surface.

Figure 3:
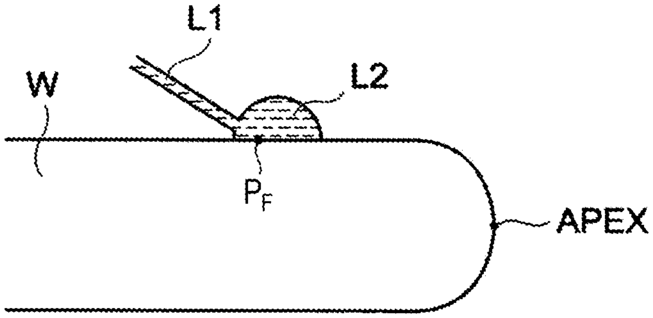
FIG. 3 is a schematic view illustrating behavior of a processing liquid, which changes according to a front surface state of a wafer, immediately after landing on the front surface of the wafer.

When the front surface of the wafer W is a hydrophobic front surface as illustrated in FIG. 3, the processing liquid ejected from the nozzle 61 is less likely to spread over the front surface. Therefore, the radial width of the region wetted by the processing liquid is narrow both radially inward and outward from the liquid landing point $P_F$. As described above, the "landing point" means the center point of the liquid column of the processing liquid (indicated by reference numeral "L1" in FIGS. 3 and 4) ejected from the nozzle 61. The processing liquid, which has landed on the hydrophobic surface, tends to separate from the front surface of the wafer W by splashing immediately upon landing of the liquid on the front surface, or to separate from the front surface of the wafer W within a short time after landing of the liquid. For this reason, a large number of minute droplets of the processing liquid tends to be generated. Minute droplets floating around the wafer W may be a cause of the generation of particles.

Figure 4:
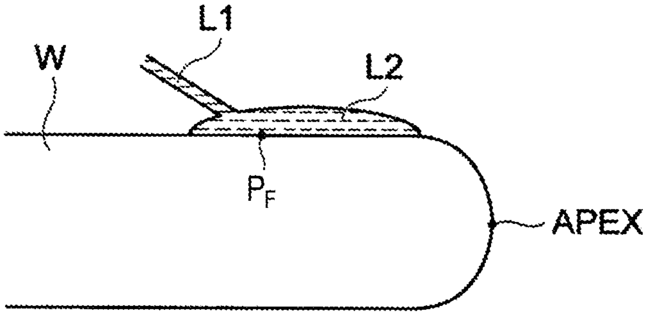
FIG. 4 is a schematic view illustrating the behavior of a processing liquid, which changes according to a front surface state of a wafer, immediately after landing on the front surface of the wafer.

When the front surface of the wafer W is a hydrophilic surface as illustrated in FIG. 4, the processing liquid ejected from the nozzle 61 easily spreads over the front surface. Therefore, the radial width of the region wetted by the processing liquid is wide both radially inward and outward from the liquid landing point $P_F$. In addition, the processing liquid tends to separate from the wafer W by a centrifugal force after spreading toward the APEX while remaining on the front surface of the wafer W for a relatively long time (compared to the case where the front surface is the hydrophobic surface) after landing. For this reason, minute droplets of the processing liquid are not generated so much. On the other hand, it is difficult to sufficiently control the radially inward spread of the processing liquid. Unless the radially inward spread is suppressed, there is a possibility that a problem will occur in terms of cutting accuracy, slope width, or the like. In order to suppress the radially inward spread of the processing liquid, it is sufficient to increase the radially outward component of the movement of the processing liquid, which may be implemented by adjusting the above-described first angle θ and second angle φ (especially, the first angle θ).

Figure 5:
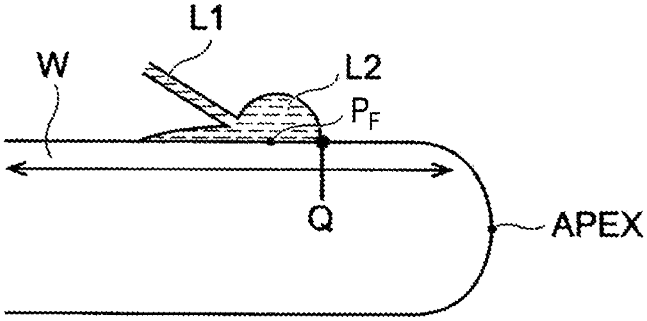
FIG. 5 is a schematic view illustrating the behavior of a processing liquid, which changes according to a front surface state of a wafer, immediately after landing on the front surface of the wafer.

As illustrated in FIG. 5, when the outer side of the position Q in the radial direction is a hydrophobic surface and the inner side is a hydrophilic surface, the radially outward spread of the processing liquid is suppressed by the hydrophobic surface, and thus the spread of the processing liquid into the radially inner region becomes larger.

Based on the above, the setting of the first angle θ and the second angle φ corresponding to the important process performance will be described.

When the chemical liquid particle performance (the number of chemical liquid particles being small) is important, the first angle θ is kept at the standard value, and the second angle φ is decreased. Particles generated during chemical liquid processing (during bevel etching) are mainly generated due to the splashing of the chemical liquid (etchant) immediately after the chemical liquid (etchant) lands on the front surface of the wafer W. Therefore, by making the second angle φ that affects the liquid splashing smaller than the standard value, the liquid splashing is suppressed. In particular, when the front surface of the wafer W is a hydrophobic surface on which liquid splashing is easily caused, the effect of suppressing the liquid splashing by decreasing the second angle φ is significant. Decreasing the second angle φ also has an effect of suppressing the spread of the chemical liquid to the region radially inside of the liquid landing point.

When the chemical liquid particle performance is important, the first angle θ may be appropriately determined within the range of $0° \leq \theta \leq 20°$, and the second angle φ may be appropriately determined within the range of $5° \leq \varphi \leq 20°$.

Even when the processing liquid is the rinse liquid, if the front surface on which the processing liquid lands is a hydrophobic surface, liquid splashing may occur. If the splashing of the rinse liquid becomes a problem, it is conceivable to make the second angle φ smaller than the standard value even during rinsing.

When the rinse particle performance (the number of rinse particles being small) is important, the first angle θ is increased while the second angle φ is kept at the standard value. Unlike chemical liquid particles generated mainly due to liquid splashing, rinse particles are generated when particles are collected at a gas-liquid interface of the rinse liquid (the innermost edge of the liquid film of the rinse liquid) during the rinsing, and the collected particles remain on the front surface of the wafer W.

An edge exclusion region is particularly considered when evaluating the rinse particle performance. As is well known in the art, the edge exclusion region is a region that is not subject to evaluation of defects such as particles, and is, for example, a ring-shaped region that spreads from the APEX to a position 2 mm radially inward from the APEX. In order to reliably wash away the chemical liquid (etchant) used in the chemical liquid processing (etching), a rinse liquid landing point is set radially inward from a chemical liquid landing point by about 0.5 mm. As described above, since the greatest number of rinse particles are generated near the air-liquid interface of the rinse liquid, the gas-liquid interface during the rinsing is located preferably as radially outward as possible, and more preferably within the edge exclusion region. As illustrated in FIGS. 3 to 5, the gas-liquid interface means the radially inner end of the cross section of the processing liquid immediately after the landing of the processing liquid (the semi-elliptical portion denoted by reference symbol L2 in FIGS. 3 to 5).

As described above with reference to FIGS. 3 to 5, when the front surface on which the rinse liquid lands is a hydrophilic surface, the rinse liquid is easily flattened immediately after the landing and spreads around the liquid landing point. When the front surface is a hydrophobic surface, the rinse liquid is difficult to flatten due to surface tension, and thus the rinse liquid is difficult to spread around the liquid landing point. When the first angle θ is small (close to zero degrees), the radially outward velocity component of the rinse liquid ejected from the nozzle becomes small. Thus, when the front surface on which the rinse liquid lands is a hydrophilic surface, the rinse liquid easily spreads radially inward from the liquid landing point. In order to suppress the radially inward spread of the rinse liquid, it is effective to increase the first angle θ to increase the radially outward velocity component of the rinse liquid. As a result, it is possible to maintain the gas-liquid interface of the rinse liquid during rinsing at a position close to the liquid landing point, so that the gas-liquid interface of the rinse liquid can be located within the edge exclusion region. Herein, the first angle θ is set to 20°.

On the other hand, when the front surface on which the rinse liquid lands is a hydrophobic surface, the rinse liquid hardly spreads toward the center side of the wafer W, but flows toward the peripheral edge of the wafer by a centrifugal force immediately after landing. Therefore, when the front surface is a hydrophobic surface, increasing the first angle θ from the view point of suppressing the spread of the rinse liquid into the radially inner region has little meaning.

When the rinse liquid particle performance is important, the first angle θ may be appropriately determined within the range of $15° \leq \theta \leq 30°$, and the second angle φ may be appropriately determined within the range of $5° \leq \varphi \leq 30°$.

Figure 6:
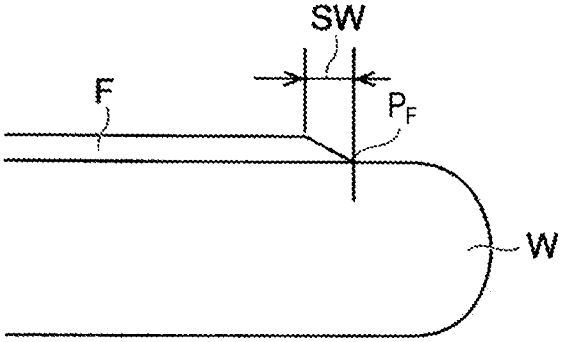
FIG. 6 is a schematic view illustrating a slope width.

When the short slope width is important, the first angle θ is increased while the second angle φ is kept at the standard value. The slope width is the width indicated by the reference numeral "SW" in FIG. 6. When the first angle θ is small, an etchant easily spreads radially inward from the liquid landing point. The reason is the same as that described in the rinse particle performance section. When the etchant spreads in the region radially inside of the liquid landing point (the point $P_F$ in FIG. 6), the film radially inside of the liquid landing point is etched to some extent. At this time, the etching amount increases toward the liquid landing point, and decreases radially inward from the liquid landing point. Therefore, when the spread of the etchant from the liquid landing point into the radially inner region increases, a relatively gentle slope is likely to be formed (that is, the width of the slope increases). In contrast, by increasing the first angle θ, since the etchant hardly spreads into a radially inner region after landing, a slope is hardly formed, or even if a slope is formed, the width of the slope is small (the slope angle is close to 90 degrees). In addition, even if the second angle φ fluctuates slightly, the width of the slope hardly changes.

When the short slope width is important, the first angle θ may be appropriately determined within the range of $10° \leq \theta \leq 40°$, and the second angle φ may be appropriately determined within the range of $5° \leq \varphi \leq 30°$.

When the prevention of jagged-shape cutting is important, the first angle θ is increased while the second angle φ is kept at the standard value. “Jagged-shape cutting” means that, when a front surface to be etched is rough (i.e., when the surface morphology is large or irregularities exist on the front surface), the cut interface (the outermost edge of the film remaining after etching) has a jagged-shape. Further, the prevention of jagged-shape cutting can be said to be included in achieving high cutting accuracy. However, herein, the “high cut precision” and the “prevention of jagged-shape cutting” to be described later are described as separate items.

As described above, when the first angle θ is increased, it becomes difficult for the etchant to spread radially inward from the liquid landing point immediately after landing. On a rough surface, when the etchant spreads radially inward from the liquid landing point, the spreading becomes non-uniform in a microscopic point of view. In other words, from a microscopic point of view, the etching amount in the vicinity of a concave portion increases because the amount of etchant that penetrates into the concave portion increases, and the etching amount in the vicinity of a convex-portion decreases because the amount of etchant that penetrates into the convex portion decreases, resulting in a jagged-shape cut interface. In contrast, by increasing the first angle θ, most of the etchant immediately after landing does not spread radially inward from the liquid landing point. That is, since the place on which the etchant directly lands becomes the cut interface, the shape of the cut interface is less likely to be affected by the rough surface, and thus a jagged-shape cut interface is less likely to be formed.

When the prevention of jagged-shape cutting is important, the first angle θ may be appropriately determined within the range of $10° \leq \theta \leq 40°$, and the second angle φ may be appropriately determined within the range of $5° \leq \varphi \leq 30°$.

The rinse particle performance, the short slope width, and the prevention of jagged-shape cutting described above are all achieved by preventing or suppressing the processing liquid from spreading radially inward from the liquid landing point. These three process performances may be made compatible.

When the notch splash particle performance (the number of particles caused by notch splash being small) is important, while the second angle φ is kept at the standard value, the first angle θ is increased. The notch depth (radial length) is usually about 1 to 1.3 mm and, depending on the radial position of the liquid landing point, the processing liquid ejected from the nozzle collides with the edge of the notch directly (or immediately after landing). This collision may cause splash, and this splash may cause particles, so suppression of notch splash contributes to the improvement of particle performance. As the first angle θ is increased, the incident angle of the processing liquid on the edge of the notch is decreased, so it is possible to suppress scattering of the processing liquid due to collision with the edge of the notch. Notch splash tends to be particularly suppressed when the angle formed by the notch edge and the direction in which the processing liquid is ejected from the nozzle is about 90 degrees in a plan view. Thus, when the notch has a normal shape, the first angle θ is preferably about 20 degrees to 25 degrees.

When the notch splash particle performance is important, the first angle θ may be appropriately determined within the range of $20° \leq \theta \leq 25°$, and the second angle φ may be appropriately determined within the range of $5° \leq \varphi \leq 30°$.

Figure 7:
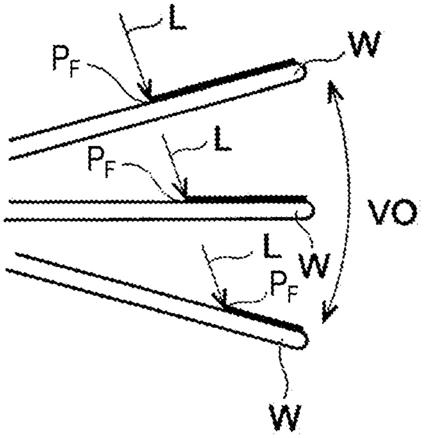
FIG. 7 is a schematic view illustrating a method of improving cutting accuracy.
Figure 8:
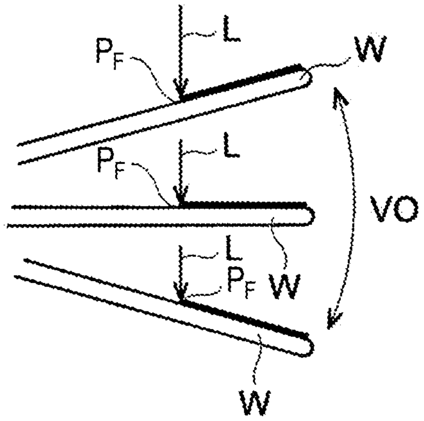
FIG. 8 is a schematic view illustrating a method of improving cutting accuracy.

When the high cutting accuracy (positional accuracy of the outermost edge of a film left without being etched during bevel etching) is important, the first angle θ is decreased while the second angle φ is kept at the standard value. When the center of the rear surface of a wafer W is held by a vacuum chuck and the wafer W rotates, the height of the liquid landing point of the etchant on the front surface of the wafer W changes due to the warping of the wafer W or the vertical vibration of the wafer W. At this time, when the first angle θ is about the standard value or larger, as illustrated in FIG. 7, the radial position of the liquid landing point $P_F$ of the processing liquid L changes relatively significantly due to the vertical vibration VO of the wafer W, and thus the cutting accuracy decreases. On the other hand, when the first angle θ is zero (or about zero), as illustrated in FIG. 8, a change in the radial position of the liquid landing point $P_F$ of the processing liquid L due to the vertical vibration VO of the wafer W is slight, which makes it possible to obtain high cutting accuracy.

When the second angle φ is decreased, the spread of the processing liquid near the liquid landing point immediately after landing (spread in the ejecting direction in a plan view) increases. Thus, due to the vertical displacement of the peripheral edge portion of the wafer W or the fluctuation in the ejection flow rate of the processing liquid from the nozzle, the cutting accuracy tends to deteriorate. Therefore, as described above, it is preferable to set the second angle φ to a relatively large angle, for example, about 20 degrees.

When the cutting accuracy is important, the first angle θ may be appropriately determined within the range of $-10° \leq \theta \leq 10°$, and the second angle φ may be appropriately determined within the range of $5° \leq \varphi \leq 30°$.

Six combinations of (θ, φ) are not necessarily required for the six different required process performances described above, and combinations of (θ, φ) corresponding to two or more required process performances may be the same. Specifically, for example, the combination of (θ, φ) corresponding to suppression of the notch splash particles and the combination of (θ, φ) corresponding to the short slope width may be the same.

When an optimum combination of (θ, φ) is set for each of the different required process performances, it is necessary to provide the number of nozzles 61 according to the number of combinations (when a nozzle posture change mechanism (described later) is not provided). As a result, the number of components of the bevel etching apparatus increases, and the manufacturing cost of the bevel etching apparatus increases. Therefore, when the optimum (θ, φ) values corresponding to one required process performance and the optimum (θ, φ) values corresponding to another required process performance are close to each other, the combinations of (θ, φ) may be made the same for these required process performances. In other words, if processing using (θ, φ) values that are capable of satisfying one required process performance can also satisfy another required process performance, the combinations of (θ, φ) may be made the same for these required process performances. Specifically, for example, when the suppression of the notch splash particles, the short slope width, the suppression of rinse particles, and the prevention of jagged-shape cutting are important, since the combinations of optimum values of the first angle θ and the second angle φ are relatively close to each other, the combinations of (θ, φ) corresponding to these required process performances may be made the same. By doing so, it is possible to make one nozzle 61 correspond to a plurality of required process performances, thereby reducing costs of the apparatus. The combination of (θ, φ) may be set individually for each required process performance, as long as it is permitted from the view point of configuration and costs of the apparatus.

Figure 9:
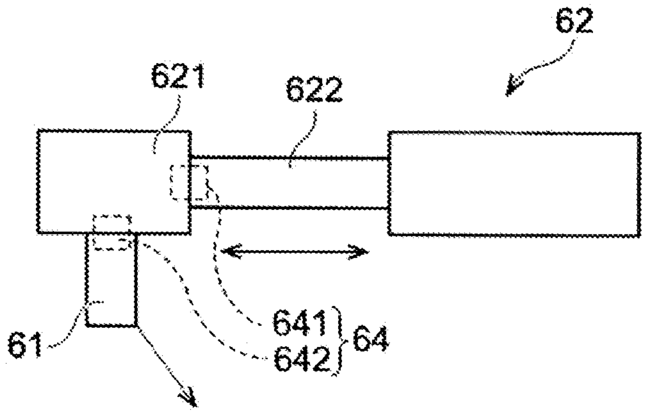
FIG. 9 is a schematic view illustrating an example of a configuration of a nozzle posture change mechanism.

A nozzle posture change mechanism 64 configured to be capable of changing the posture of the nozzle 61 steplessly or in multiple steps may be provided. Specifically, for example, as illustrated in FIG. 9, the nozzle posture change mechanism 64 may include a first rotation mechanism 641, which is configured to rotate a nozzle holder 621 holding the nozzle 61 around a horizontal axis with respect to a rod 622 of the nozzle moving mechanism 62 that is movable backward and forward, and a second rotation mechanism 642, which is configured to rotate the nozzle 61 around a vertical axis with respect to the nozzle holder 621. Instead of the first rotation mechanism 641, a mechanism configured to rotate the rod 631 itself around a horizontal axis may be provided. A swinging mechanism configured to swing the entire nozzle moving mechanism 62 around a horizontal swing axis may be provided. By providing such a nozzle posture change mechanism 64, it is possible to change at least one of the first angle θ or the second angle φ. When the nozzle posture change mechanism 64 includes a biaxial rotation mechanism as described above, it is possible to change both the first angle θ and the second angle φ. By providing the nozzle posture change mechanism 64, it is possible to reduce the number of nozzles 61. The arrow extending obliquely downward from the nozzle 61 indicates the processing liquid ejected from the nozzle 61.

Next, a specific example of bevel etching using the processing unit 16 will be described. In the specific example described below, an etching apparatus 1 including four nozzles 61 is used. The four nozzles 61 are called Nozzle A, Nozzle B, Nozzle C, and Nozzle D to distinguish from one another. Nozzle A, Nozzle B, Nozzle C, and Nozzle D are located above the peripheral edge portion of a wafer W, as schematically illustrated in FIG. 10.

Figure 10:
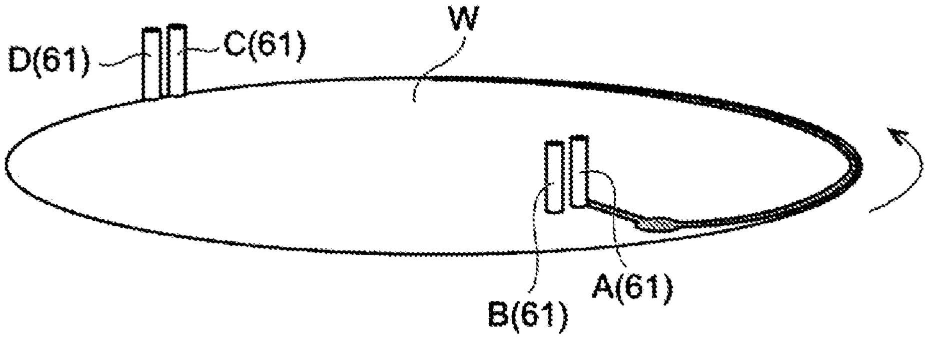
FIG. 10 is a schematic perspective view illustrating an arrangement of nozzles in a specific example.

FIG. 10 illustrates a state in which a processing liquid is ejected from Nozzle A, and schematically illustrates the behavior of the processing liquid that has landed on the front surface of the wafer W. After landing on the front surface of the wafer W, the processing liquid flows while spreading in the radial direction (when the front surface is hydrophilic), and finally is separated outward from the wafer by a centrifugal force. In this case, a band of processing liquid extending parallel to the peripheral edge of the wafer W is observed. When the front surface of the wafer W is hydrophobic, the processing liquid is separated from the wafer W immediately after landing on the front surface of the wafer W or in a short period of time after the landing. Therefore, no band of processing liquid extending parallel to the periphery of the wafer W is observed, or, even if a band is observed, its length is very short.

In Nozzle A, Nozzle B, Nozzle C, and Nozzle D, combinations of the first angle θ and the second angle φ are as follows.

Nozzle A: (θ, φ)=(5°, 20°)
Nozzle B: (θ, φ)=(10°, 10°)
Nozzle C: (θ, φ)=(25°, 20°)
Nozzle D: (θ, φ)=(25°, 20°)

A nozzle moving mechanism 62 attached to each of nozzles 61 (A to D) moves each nozzle 61 such that the position of the liquid landing point $P_F$ of the processing liquid ejected from the nozzle is adjusted in the radial direction of the wafer W. Each nozzle 61 is supported by the nozzle moving mechanism 62 such that the values of the first angle θ and the second angle φ are substantially constant regardless of the radial position of the nozzle 61.

In the following description, the radial position of a point on the front surface of the wafer W (e.g., the radial position of the liquid landing point of the processing liquid) is represented by the radial direction of the wafer from the APEX of the wafer W to that point (the radially inward direction is negative). For example, when Dr of a certain point is described as −1.0 mm, it means that the point is located 1.0 mm radially inward from the APEX.

In the following specific examples, the posture of each nozzle 61 is fixed, and the first angle θ and the second angle φ are values unique to the nozzle 61.

First Specific Example

In a first specific example, when a hydrophilic film (e.g., a silicon oxide film) is formed on a hydrophobic surface (e.g., a surface of bare silicon), the hydrophilic film on the peripheral edge portion of the wafer W is removed with a chemical liquid (hydrofluoric acid).

First, the wafer W is rotated. Rotation of the wafer W continues until the end of processing.

Next, ejection of hydrofluoric acid (HF) is started from Nozzle A such that the position Dr of the liquid landing point $P_F$ becomes −1.0 mm. For Nozzle A, (θ, φ) is (5°, 20°), which meets a condition in which cutting accuracy is important. In addition, when the surface on which the HF lands is a hydrophilic surface, even if the first angle θ is changed, there is almost no change in the liquid splashing state, and there is no problem with the chemical liquid particle performance.

Thereafter, Nozzle A is moved to gradually move the liquid landing point $P_F$ radially outward. When the position Dr of the liquid landing point $P_F$ advances radially outward beyond −0.8 mm, ejection of HF is started from Nozzle B such that the position Dr of the liquid landing point $P_F$ becomes −0.8 mm, and ejection of HF from Nozzle A is stopped. Since the hydrophilic film has already been removed by the HF ejected from Nozzle A near the position of Dr=−0.8 mm, the HF ejected from Nozzle B lands on the hydrophobic surface. For Nozzle B, (θ, φ) is (10°, 10°), which corresponds to the case where the chemical liquid particle performance (especially, the chemical liquid particle performance on a hydrophobic surface) is important. Since splashing of HF landing on the hydrophobic surface is prevented, it is possible to suppress generation of particles.

Thereafter, Nozzle A is moved to gradually move the liquid landing point radially outward. When the hydrophobic surface is exposed in a desired region (up to a position slightly below the APEX), ejection of a rinse liquid (DIW) is started from Nozzle D such that the position Dr of the liquid landing point $P_F$ becomes −1.5 mm, and ejection of HF from Nozzle B is stopped. For Nozzle D, (θ, φ) is (25°, 20°), which corresponds to the condition in which the rinse particle performance is important. Thereafter, Nozzle D is moved to gradually move the liquid landing point radially outward. When the rinsing of a required region is completed, ejection of the rinse liquid from Nozzle D is stopped, and the wafer W is shaken and dried.

Second Specific Example

In a second specific example, when a hydrophobic film is further formed on a hydrophilic film formed on the front surface of a wafer W, the hydrophilic film and the hydrophobic film on the peripheral edge position of the wafer W are removed with a chemical liquid (hydrofluoric acid).

First, the wafer W is rotated. Rotation of the wafer W continues until the end of processing.

Next, ejection of hydrofluoric acid (HF) is started from Nozzle B such that the position Dr of the liquid landing point $P_F$ becomes −1.0 mm. For Nozzle B, (θ, φ) is (10°, 10°), which corresponds to the condition in which the chemical liquid particle performance is important. Since splashing of HF landing on the hydrophobic surface is prevented, it is possible to suppress generation of particles.

Thereafter, Nozzle B is moved to gradually move the liquid landing point $P_F$ radially outward. Then, when the hydrophobic film is removed in a desired area (up to a position slightly below the APEX), ejection of hydrofluoric acid (HF) is started from Nozzle A such that the position Dr of the liquid landing point becomes −1.0 mm, and ejection of HF from Nozzle B is stopped. For Nozzle A, (θ, φ) is (5°, 20°), which meets a condition in which cutting accuracy is important. Since the HF ejected from Nozzle A lands on the hydrophilic surface, it is not necessary to consider splashing.

Thereafter, Nozzle A is moved to gradually move the liquid landing point radially outward. When the hydrophilic film is removed in a desired area (up to a position slightly below the APEX), ejection of a rinse liquid (DIW) is started from Nozzle D such that the position Dr of the liquid landing point becomes −1.5 mm, and ejection of HF from Nozzle A is stopped. For Nozzle D, (θ, φ) is (25°, 20°), which meets a condition in which rinse particle performance is important. Thereafter, Nozzle D is moved to gradually move the liquid landing point radially outward. When the rinsing of a required region is completed, ejection of the rinse liquid from Nozzle D is stopped, and the wafer W is shaken and dried.

Third Specific Example

In a third specific example, in the case where a high-etching rate film (referred to as a "high ER film") is further formed on a low-etching rate film (referred to as a "low ER film") formed on the front surface of a wafer W, the low ER film and the high ER film in the peripheral edge portion of the wafer W are removed with a chemical liquid (hydrofluoric acid).

First, the wafer W is rotated. Rotation of the wafer W continues until the end of processing.

Next, ejection of hydrofluoric acid (HF) is started from Nozzle C such that the position Dr of the liquid landing point $P_F$ becomes −1.0 mm. For Nozzle C, (θ, φ) is (25°, 20°), which corresponds to a condition in which the short slope width is important. Since the low ER film is etched with only slight contact with the etchant, the width of the slope tends to increase due to the etchant that has spread radially inward. In order to prevent expansion of the slope width, the above-described conditions are adopted.

Thereafter, Nozzle C is moved to gradually move the liquid landing point radially outward. Then, when the low ER film is removed in a desired area (up to a position slightly below the APEX), ejection of hydrofluoric acid (HF) is started from Nozzle A such that the position Dr of the liquid landing point $P_F$ becomes −1.0 mm, and ejection of HF from Nozzle C is stopped. For Nozzle A, (θ, φ) is (5°, 20°), which corresponds to a condition in which cutting accuracy is important. Since the high ER film tends to have a relatively small slope width, etching is performed under a condition in which the cutting accuracy is important without considering the slope width.

Thereafter, Nozzle A is moved to gradually move the liquid landing point radially outward. When the hydrophilic film is removed in a desired area (up to a position slightly below the APEX), ejection of a rinse liquid (DIW) is started from Nozzle D such that the position Dr of the liquid landing point becomes −1.5 mm, and ejection of HF from Nozzle A is stopped. For Nozzle D, (θ, φ) is (25°, 20°), which corresponds to a condition in which rinse particle performance is important. Thereafter, Nozzle D is moved to gradually move the liquid landing point radially outward. When the rinsing of a required region is completed, ejection of the rinse liquid from Nozzle D is stopped, and the wafer W is shaken and dried.

Fourth Specific Example

As a fourth specific example, in a case where a film having a large surface morphology (microscopically, a film having a rough surface (a rough surface film)) is formed on a film having a small surface morphology (microscopically, a film having a flat surface film (a flat surface film)) formed on the surface of a wafer W, the flat surface film and the rough surface film are removed with a chemical liquid (hydrofluoric acid).

First, the wafer W is rotated. Rotation of the wafer W continues until the end of processing.

Next, ejection of hydrofluoric acid (HF) is started from Nozzle C such that the position Dr of the liquid landing point becomes −1.0 mm. For Nozzle C, (θ, φ) is (25°, 20°), which corresponds to a condition in which prevention of jagged-shape cutting is important.

Thereafter, Nozzle C is moved to gradually move the liquid landing point radially outward. Then, when the rough surface film is removed in a desired area (up to a position slightly below the APEX), ejection of hydrofluoric acid (HF) is started from Nozzle A such that the position Dr of the liquid landing point becomes −1.0 mm, and ejection of HF from Nozzle C is stopped. For Nozzle A, (θ, φ) is (5°, 20°), which corresponds to a condition in which the cutting accuracy is important. Since the flat surface film does not have the problem of jagged-shape cutting, etching is performed under a condition in which the cutting accuracy is important.

Thereafter, Nozzle A is moved to gradually move the liquid landing point radially outward. When the flat surface film is removed in a desired area (up to a position slightly below the APEX), ejection of a rinse liquid (DIW) is started from Nozzle D such that the position Dr of the liquid landing point becomes −1.5 mm, and ejection of HF from Nozzle A is stopped. For Nozzle D, (θ, φ) is (25°, 20°), which corresponds to a condition in which the rinse particle performance is important. Thereafter, Nozzle D is moved to gradually move the liquid landing point radially outward. When the rinsing of a required region is completed, ejection of the rinse liquid from Nozzle D is stopped, and the wafer W is shaken and dried.

In each of the above-described embodiments, nozzles to be used may be selected according to a predetermined process recipe. That is, in this case, in the process recipe, for each processing step, parameter values corresponding to various process conditions such as "wafer rotation speed: XX rpm; nozzle to be used: Nozzle A; processing liquid to be ejected: HF; liquid landing point: moving from Dr=−1.0 mm to the APEX; and moving speed: YY mm/sec" are determined in advance. Then, the controller 14 controls the rotational driver 22, the nozzle moving mechanism 62, the processing liquid supply mechanism 63, and the like such that the process conditions defined in the process recipe are implemented, thereby performing the liquid processing of the bevel portion.

Instead of predetermining all process conditions in a process recipe, the above-described substrate processing apparatus 1 or a substrate processing system including the substrate processing apparatus 1 as a processing unit may have a function of determining at least some of the process conditions according to inspection results of the state of the processing target surface of a wafer W. Specifically, for example, an inspection part configured to inspect the state of a target surface of the wafer W is provided. The inspection part may be a stand-alone inspection device or an inspection unit incorporated within the housing of the above-described substrate processing system. Examples of the state of the target surface of the wafer W inspected by the inspection part include a surface morphology, a notch shape, a warpage state, a contact angle (observed by, for example, a high-speed camera or the like during liquid processing), and the like.

The inspection results by the inspection part are input to the controller 14 (see FIG. 1). A required processing result (the important process performance) is input to the controller 14. The desired processing result may be input to the controller 14 via communication from a host computer, or manually by an operator via a user interface (a touch panel, a keyboard, or the like) of the substrate processing apparatus 1 or the substrate processing system. With reference to, for example, an angle table stored in a storage part 141 (a data base storing ejection angles (the first angle θ and the second angle (p) corresponding to desired processing results), an arithmetic operation part 142 of the controller 14 obtains appropriate values of the first angle θ and the second angle gyp, and selects a nozzle 61 having the values. Processes other than the selection of the nozzle 61 may be executed according to the process recipe.

As described above, by appropriately changing the ejection angles (the first angle θ and the second angle (p) of the processing liquid from the nozzle 61, it is possible to obtain a desirable processing result that achieves the most important process performance.

In the above description, only the processing on the front surface side of a wafer W is mentioned, but the processing on the rear surface side of the wafer W may be performed simultaneously with the processing on the front surface side of the wafer W.

The embodiments disclosed herein should be considered to be exemplary in all respects and not restrictive. The embodiments described above may be omitted, replaced, or modified in various forms without departing from the scope and spirit of the appended claims.

EXPLANATION OF REFERENCE NUMERALS

6: ejection part, 14: controller, 21: substrate holder, 22: rotational driver

What is claimed is:

1. A substrate processing system that processes a peripheral edge portion of a front surface of a substrate with a processing liquid, the substrate processing system comprising:

a substrate holder configured to hold the substrate;

a rotational driver configured to rotate the substrate holder around a rotation axis;

an ejection part configured to eject the processing liquid toward a liquid landing point set in the peripheral edge portion of the front surface of the substrate; and a controller configured to control at least an operation of the ejection part, wherein, when a circle, which is centered on a foot of a perpendicular line drawn from the liquid landing point to the rotation axis, a radius of which is a line segment interconnecting the foot of the perpendicular line and the liquid landing point, and which is located on a plane orthogonal to the rotation axis, is defined, and a tangential line to the circle at the liquid landing point is defined, when an angle formed by a straight line, which interconnects a foot of a perpendicular line drawn from an ejection point of the processing liquid to the front surface of the substrate and the liquid landing point, and a tangential line to the circle at the liquid landing point is a first angle θ, and when an angle formed by the straight line, which interconnects the foot of the perpendicular line drawn from the ejection point of the processing liquid to the front surface of the substrate and the liquid landing point, and a straight line, which interconnects the ejection point and the liquid landing point, is a second angle φ, the ejection part includes a plurality of nozzles that is capable of ejecting a same first processing liquid as the processing liquid, and one nozzle and another nozzle among the plurality of nozzles are configured to be different from each other in at least one of the first angle θ or the second angle φ, wherein the controller is further configured to control, based on an attribute of the substrate on which the first processing liquid ejected from the ejection part lands or a film formed on the substrate and an important process performance, the ejection part such that the first processing liquid is ejected by using a nozzle that is selected from among the plurality of nozzles and is capable of achieving the important process performance, and wherein the controller is further configured to set a standard value of a combination of the first angle θ and the second angle φ at which results within an allowable range in all items of process performances are obtained, and to adjust such that the second angle φ is made smaller than the standard value when a surface of the substrate is hydrophobic while the first angle θ is made larger than the standard value when the surface of the substrate is hydrophilic.

2. The substrate processing system of claim 1, wherein the controller is configured to control the ejection part such that the first processing liquid is ejected by using the nozzle that is selected from among the plurality of nozzles and is capable of achieving the important process performance according to a processing recipe that defines a processing condition for the substrate and a nozzle to be used.

3. The substrate processing system of claim 2, wherein the ejection part includes a nozzle that is different from the plurality of nozzles and is configured to eject, as the processing liquid, a second processing liquid different from the first processing liquid, or the ejection part is configured such that one nozzle among the plurality of nozzles capable of ejecting the first processing liquid is also capable of ejecting the second processing liquid.

4. The substrate processing system of claim 1, wherein the controller is configured to have a function of selecting, from among the plurality of nozzles, a nozzle that is capable of achieving the important process performance based on the attribute of the substrate on which the first processing liquid ejected from the ejection part lands or the film formed on the substrate and the important process performance, and the controller is further configured to control the ejection part such that the first processing liquid is ejected by using the selected nozzle.

5. The substrate processing system of claim 1, wherein the controller is further configured to control the ejection part such that, with respect to a same substrate, after the first processing liquid is ejected from the one nozzle among the plurality of nozzles, the first processing liquid is ejected from the another nozzle.

6. The substrate processing system of claim 1, wherein the ejection part includes a nozzle that is different from the plurality of nozzles and is configured to eject, as the processing liquid, a second processing liquid different from the first processing liquid, or the ejection part is configured such that one nozzle among the plurality of nozzles capable of ejecting the first processing liquid is also capable of ejecting the second processing liquid.

7. The substrate processing system of claim 1, wherein the attribute of the substrate or the film formed on the substrate includes at least one of:

affinity for the processing liquid;

surface roughness; or etching rate for the processing liquid, and wherein the important process performance includes at least one of:

a small amount of particles;

a short slope width; or high cutting accuracy.

8. A substrate processing system that processes a peripheral edge portion of a front surface of a substrate with a processing liquid, the substrate processing system comprising:

a substrate holder configured to hold the substrate;

a rotational driver configured to rotate the substrate holder around a rotation axis;

an ejection part configured to eject the processing liquid toward a liquid landing point set in the peripheral edge portion of the front surface of the substrate; and a controller configured to control at least an operation of the ejection part, wherein the controller is further configured to control, based on an attribute of the substrate on which the processing liquid ejected from the ejection part lands or a film formed on the substrate and an important process performance, the ejection part such that a first angle θ and a second angle φ at which the important process performance is achievable are implemented, wherein, when a circle, which is centered on a foot of a perpendicular line drawn from the liquid landing point to the rotation axis, a radius of which is a line segment interconnecting the foot of the perpendicular line and the liquid landing point, and which is located on a plane orthogonal to the rotation axis, is defined, and a tangential line to the circle at the liquid landing point is defined, the first angle θ is an angle formed by a straight line, which interconnects a foot of a perpendicular line drawn from an ejection point of the processing liquid to the front surface of the substrate and the liquid landing point, and a tangential line to the circle at the liquid landing point, and the second angle φ is an angle formed by the straight line, which interconnects the foot of the perpendicular line drawn from the ejection point of the processing liquid to the front surface of the substrate and the liquid landing point, and a straight line, which interconnects the ejection point and the liquid landing point, and wherein the controller is further configured to set a standard value of a combination of the first angle θ and the second angle φ at which results within an allowable range in all items of process performances are obtained, and to adjust such that the second angle φ is made smaller than the standard value when a surface of the substrate is hydrophobic while the first angle θ is made larger than the standard value when the surface of the substrate is hydrophilic.

9. The substrate processing system of claim 8, wherein the ejection part includes a plurality of nozzles that is capable of ejecting a same processing liquid, and one nozzle and another nozzle among the plurality of nozzles are configured to be different from each other in at least one of the first angle θ or the second angle φ.

10. The substrate processing system of claim 9, wherein the attribute of the substrate or the film formed on the substrate includes at least one of:

affinity for the processing liquid;

surface roughness; or etching rate for the processing liquid, and wherein the important process performance includes at least one of:

a small amount of particles;

a short slope width; or high cutting accuracy.

11. The substrate processing system of claim 8, wherein the ejection part includes a nozzle configured to eject the processing liquid, and a nozzle posture changer configured to change at least one of the first angle θ or the second angle φ of the nozzle by changing a posture of the nozzle.

12. The substrate processing system of claim 8, wherein the attribute of the substrate or the film formed on the substrate includes at least one of:

affinity for the processing liquid;

surface roughness; or etching rate for the processing liquid, and wherein the important process performance includes at least one of:

a small amount of particles;

a short slope width; or high cutting accuracy.

* * * * *